Oct. 11, 1927.
W. W. JOHNSON
1,644,837
YIELDING WINDSHIELD FOR FUNNELS
Filed April 20, 1927
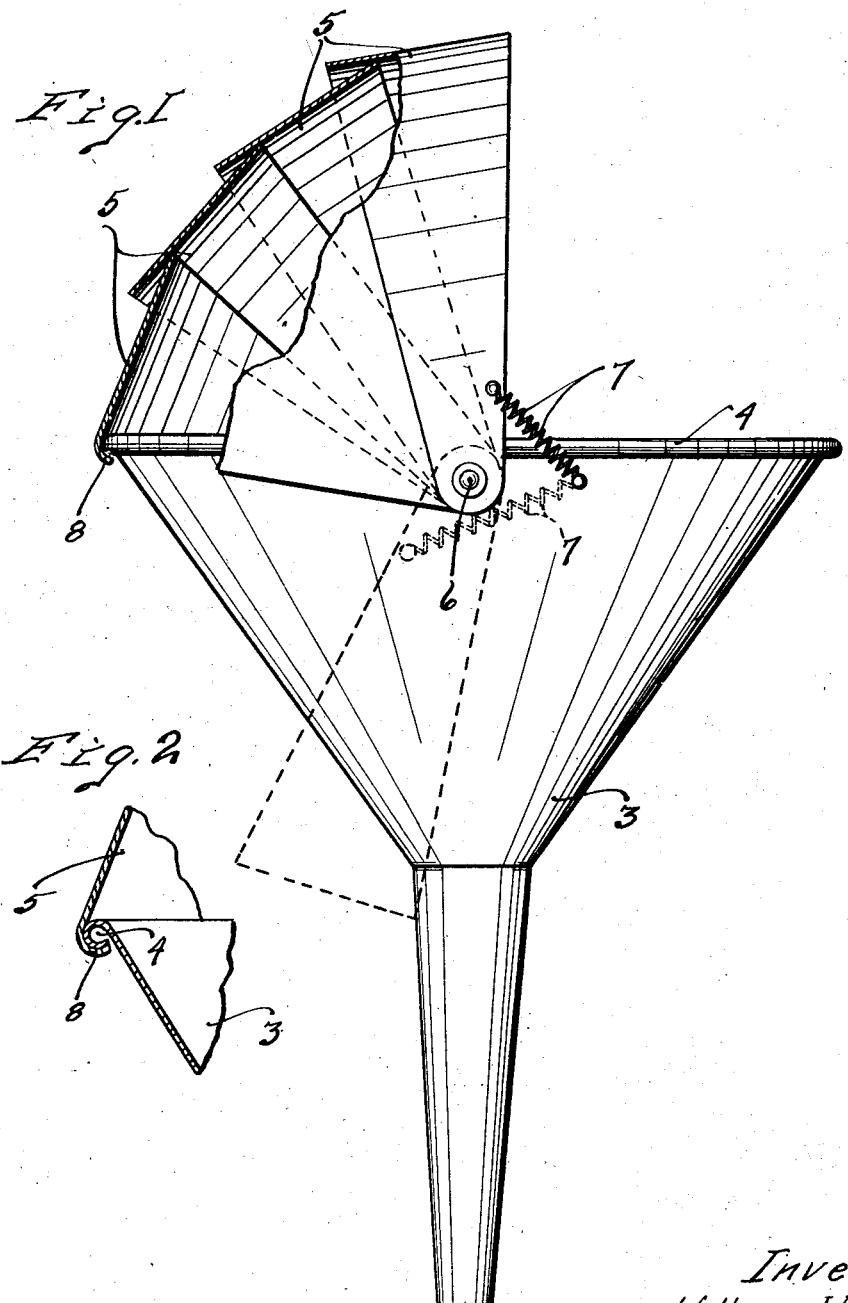
Inventor
William W. Johnson
By his Attorneys Patented Oct. 11, 1927.

1,644,837

UNITED STATES PATENT OFFICE.

WILLIAM W. JOHNSON, OF ALMORA, MINNESOTA.

YIELDING WINDSHIELD FOR FUNNELS.

Application filed April 20, 1927. Serial No. 185,169.

My invention has for its object to provide a yielding collapsible wind shield for funnels, and to this end it consists of a novel construction and arrangement of parts hereinafter described and defined in the claims.

In the accompanying drawings, which illustrate the invention, like characters indicate like parts throughout the several views.

Referring to the drawings:

Fig. 1 is a side elevation of a funnel having the wind shield applied thereto, some parts of said wind shield being broken away and other parts thereof sectioned; and Fig. 2 is a fragmentary detail view in section showing the stop connection between the wind shield and funnel.

The numeral 3 indicates a funnel having an outwardly rolled or beaded upper edge 4. The wind shield comprises a plurality of sections of progressively smaller diameters fitted the one within the other from the top down for movement about a common axis. The end portions of the sections 5 rest the one upon the other, and are secured to the funnel 3 at diametrically opposite points by a pair of axially aligned rivets 6. These rivets 6 connect the sections 5 for fan-like opening and closing movements.

The crowns of the sections 5 are radially spaced from each other so as to permit limited swinging movements of said sections within each other, but not for complete separation. The engagement between the sections 5 of the wind shield when open, as shown in Fig. 1, is such as to hold said sections suspended the one from the other.

A coiled spring 7, anchored to the funnel 3 and attached to the top section 5, is under strain to hold said section and hence the entire wind shield yieldingly open or raised. A hook-like lip 8, on the lower section 5, engages the bead 4 and limits the lifting movement of the wind shield. By collapsing the wind shield, the spring 7 may be moved to the opposite side of the axis of the rivets 6, or in other words, beyond a dead center and thereby hold the wind shield collapsed, as indicated by broken lines in Fig. 1.

By turning the wind shield toward the wind it will prevent liquids from being blown away or spilled when pouring or discharging the same into the funnel 3. Said invention is especially well adapted for use around tractors when in the field, where it is often necessary to replenish the oil or fuel supply with a strong wind blowing. While the invention is intended for general use, it is especially adapted for use around motor vehicles when filling the crank case with oil or when filling the tank with gasoline or other liquid fuel. As is well known, space is often limited in a motor vehicle and the purpose of providing a yieldingly collapsible wind shield is to permit the same to yield, if brought into contact with a part of the motor or vehicle, in order to properly position the funnel.

What I claim is:

1. A funnel having a collapsible sectional wind shield pivoted thereto, and a spring anchored to the funnel and attached to the wind shield and movable with the wind shield from one side of a dead center to the other for holding the wind shield either open or collapsed.

2. A funnel having a collapsible wind shield comprising overlapping segmental sections the sides of which are attached to the funnel to move about a common axis and fold the one within the other, and yielding means under strain to hold the wind shield open.

3. A funnel having a beaded upper edge and a collapsible wind shield comprising upper, lower and intermediate segmental sections the sides of which are attached to the funnel to move about a common axis and fold the one within the other, said sections being arranged to successively pick up one another and move the same to open positions by a lifting movement of the upper section, and yielding means holding the upper section raised.

In testimony whereof I affix my signature.

WILLIAM W. JOHNSON.